United States Patent
Cipriani et al.

(10) Patent No.: US 10,318,558 B2
(45) Date of Patent: Jun. 11, 2019

(54) AUTOMATING WEATHER MODEL CONFIGURATIONS

(71) Applicants: International Business Machines Corporation, Armonk, NY (US); Universiti Brunei Darussalam, Brunei Darussalam (BN)

(72) Inventors: James Peter Cipriani, Danbury, CT (US); Thomas George, Bangalore (IN); Saiful A. Husain, Brunei (BN); Rashmi Mittal, New Delhi (IN); Anthony P. Praino, Poughquag, PA (US); Yogish Sabharwal, New Delhi (IN); Vaibhav Saxena, New Delhi (IN); Lloyd Alan Treinish, Cortlandt Manor, NY (US)

(73) Assignees: INTERNATIONAL BUSINESS MACHINES CORPORATION, Armonk, NY (US); UNIVERSITI BRUNEI DARUSSALAM, Tungku Link (BN)

( * ) Notice: Subject to any disclaimer, the term of this patent is extended or adjusted under 35 U.S.C. 154(b) by 909 days.

(21) Appl. No.: 13/679,274

(22) Filed: Nov. 16, 2012

(65) Prior Publication Data
US 2014/0142912 A1    May 22, 2014

(51) Int. Cl.
*G01W 1/10* (2006.01)
*G06F 16/29* (2019.01)
*G06F 17/30* (2006.01)

(52) U.S. Cl.
CPC ............... *G06F 16/29* (2019.01); *G01W 1/10* (2013.01); *Y02A 90/15* (2018.01)

(58) Field of Classification Search
CPC ....................................................... G01W 1/10
See application file for complete search history.

(56) References Cited

U.S. PATENT DOCUMENTS

| 5,874,955 A | 2/1999 | Rogowitz et al. |
| 6,535,817 B1 * | 3/2003 | Krishnamurti .......... G01W 1/10 702/3 |

(Continued)

FOREIGN PATENT DOCUMENTS

WO    2009086560    7/2009

OTHER PUBLICATIONS

Lermusiaux, Pierre FJ. "Adaptive modeling, adaptive data assimilation and adaptive sampling." Physica D: Nonlinear Phenomena 230.1 (2007): 172-196.*

(Continued)

*Primary Examiner* — Saif A Alhija
*Assistant Examiner* — Bijan Mapar
(74) *Attorney, Agent, or Firm* — Ference & Associates LLC (57) ABSTRACT

Methods and arrangements for automating weather model configurations. Characteristics of a target geographical area are received, as are a plurality of existing weather model configurations which are implemented for undertaking weather modeling in other geographical areas. A subset of the existing weather model configurations is selected, the subset comprising configurations corresponding to geographical areas having characteristics similar to the characteristics of the target area. A weather model is run with respect to each configuration in the subset of existing weather model configurations. Based on the running of a weather model with respect to each configuration, an output set of weather model configurations is selected for undertaking weather modeling in the target area.

18 Claims, 3 Drawing Sheets

(56) References Cited

U.S. PATENT DOCUMENTS

| | | | |
|---|---|---|---|
| 7,082,382 B1* | 7/2006 | Rose, Jr. | G01W 1/02 702/183 |
| 7,792,664 B1* | 9/2010 | Crawford | G01W 1/10 702/3 |
| 7,982,658 B2* | 7/2011 | Kauffman | G01S 13/953 342/26 B |
| 2004/0143396 A1* | 7/2004 | Allen et al. | 702/3 |
| 2008/0167822 A1* | 7/2008 | Loukos | G01W 1/10 702/3 |
| 2012/0046917 A1* | 2/2012 | Fang | G01W 1/10 703/1 |
| 2012/0207343 A1* | 8/2012 | Ravela | G01W 1/10 382/100 |
| 2013/0322681 A1* | 12/2013 | Ravela | G01W 1/10 382/100 |

OTHER PUBLICATIONS

Paras, Sanjay Mathur et at; "A Feature Based Neural Network Model for Weather Forecasting," World Academy of Science, Engineering and Technology, 2007, pp. 66-73, vol. 34, Scientia-Open Access Database.

Ludwar, Helmut, "Deep Thunder: Local Area Precision Forecasting for Weather-Sensitive Business Operations," Power Point Presentation, IBM Symposium, Oct. 7, 2010, Congress Center Wien, Vienna, Austria.

Cover, T. M. et al., "Nearest Neighbor Pattern Classification," IEEE Transactions of Information Theory, Jan. 1967, pp. 21-27; vol. IT-13, No. 1; IEEE Information Theory Society, Piscataway, New Jersey, USA.

Alpert, P. et al., "Can Sensitivity Studies Yield Absolute Comparisons for the Effects of Several Processes?" Notes and Correspondence, Journal of the American Meteorological Society, Mar. 1, 1995, pp. 597-601, American Meteorological Society, Boston, Massachusetts, USA.

Stein, U. et al., "Factor Separation in Numerical Simulations," Journal of the American Meteorological Society, Jul. 15, 1993, pp. 2107-2115, American Meteorological Society, Boston, Massachusetts, USA.

Liang, X-Z. et al., "Regional Climate-Weather Research and Forecasting Model," Bulletin of the American Meteorological Society, Sep. 2012, pp. 1363-1387, American Meteorological Society, Boston, Massachusetts, USA.

Guyon, Isabelle et al., "An Introduction to Variable and Feature Selection," Journal of Machine Learning Research, 2003, pp. 1157-1182; vol. 3, MIT Press, Cambridge, Massachusetts, USA.

Mackay, David J. C. et al., "Information-Based Objective Functions for Active Data Selection," Neural Computation, 1992, pp. 590-604, vol. 4, Massachusetts Institute of Technology, Cambridge, Massachusetts, USA.

\* cited by examiner

AUTOMATING WEATHER MODEL CONFIGURATIONS

BACKGROUND

A weather model is a mathematical description of the physics of the atmosphere. As such, weather models incorporate assumptions that the sun adds energy, gases rise from the surface and convection can lead to winds, among other basic assumptions. Numerical weather prediction is done by solving equations relating to these assumptions (and often, other inputs) on a 4-dimensional grid (e.g., latitude, longitude, altitude, time), and is complementary to actually observed weather patterns or behavior. A solution yields predictions of the following variables, among others, both at surface and upper air locations: temperature, humidity, moisture, pressure; wind speed and direction; cloud cover and visibility; and precipitation type and intensity.

However, configuring a weather model for a new target area is a time-consuming process. Particularly, there is a need in such cases to study the geographical and climatological features of the area (e.g., tropical region, temperate region, etc.), including surveying relevant academic literature. Model configurations for other areas with similar characteristics are typically studied. The domain which covers the target area, constrained by available business applications, needs to be set up and, in that connection, domain resolution needs to be determined, often subject to severe practical constraints.

Even beyond the challenges just mentioned, initial model configuration parameters then need to be decided, e.g., physics, micro-physics, dynamics, and cumulus parameters (among a very large set of parameters in general). The weather model needs to be run on a computing platform for hindcasting several past events (which involves testing one or more forecasts retrospectively) that are representative of associated business applications, and configuration parameters need to be fine-tuned and updated for improved accuracy and for restricting the computational requirements to desired limits. Overall, significant manual intervention and domain expertise are normally required in a model setup phase, often far out of proportion to the quality and usefulness of the product derived.

BRIEF SUMMARY

In summary, one aspect of the invention provides a method of automating weather model configurations, the method comprising: utilizing a processor to execute computer code configured to perform the steps of: receiving characteristics of a target geographical area; receiving a plurality of existing weather model configurations which are implemented for undertaking weather modeling in other geographical areas; selecting a subset of the existing weather model configurations, the subset comprising configurations corresponding to geographical areas having characteristics similar to the characteristics of the target area; running a weather model with respect to each configuration in the subset of existing weather model configurations; and based on the running of a weather model with respect to each configuration, selecting an output set of weather model configurations for undertaking weather modeling in the target area.

Another aspect of the invention provides an apparatus for automating weather model configurations, the apparatus comprising: at least one processor; and a computer readable storage medium having computer readable program code embodied therewith and executable by the at least one processor, the computer readable program code comprising: computer readable program code configured to receive characteristics of a target geographical area; computer readable program code configured to receive a plurality of existing weather model configurations which are implemented for undertaking weather modeling in other geographical areas; computer readable program code configured to select a subset of the existing weather model configurations, the subset comprising configurations corresponding to geographical areas having characteristics similar to the characteristics of the target area; computer readable program code configured to run a weather model with respect to each configuration in the subset of existing weather model configurations; and computer readable program code configured, based on the running of a weather model with respect to each configuration, to select an output set of weather model configurations for undertaking weather modeling in the target area.

An additional aspect of the invention provides a computer program product for automating weather model configurations, the computer program product comprising: a computer readable storage medium having computer readable program code embodied therewith, the computer readable program code comprising: computer readable program code configured to receive characteristics of a target geographical area; computer readable program code configured to receive a plurality of existing weather model configurations which are implemented for undertaking weather modeling in other geographical areas; computer readable program code configured to select a subset of the existing weather model configurations, the subset comprising configurations corresponding to geographical areas having characteristics similar to the characteristics of the target area; computer readable program code configured to run a weather model with respect to each configuration in the subset of existing weather model configurations; and computer readable program code configured, based on the running of a weather model with respect to each configuration, to select an output set of weather model configurations for undertaking weather modeling in the target area.

A further aspect of the invention provides a method comprising: receiving spatial, topographical and climatological characteristics of a target geographical area; determining available computer resources; receiving a plurality of existing weather model configurations which are implemented for undertaking weather modeling in other geographical areas; selecting a subset of the weather model configurations, based on at least one similarity characteristic with respect to the target geographical area, the at least one similarity characteristic comprising at least one member selected from the group consisting of: a spatial characteristic; a topographical characteristic; and a climatological characteristic; revising the subset based on the at least one similarity characteristic; running a weather model with respect to each configuration from the revised subset of model configurations; and based on the running of a weather model with respect to each configuration, and based on available computer resources, selecting an output set of model configurations for undertaking weather modeling in the target area.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made here below to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIG. 1 can be performed or utilized by way of a processing unit or units and system memory such as those indicated, respectively, at 16' and 28' in FIG. 3, whether on a server computer, a client computer, a node computer in a distributed network, or any combination thereof.

Generally, in accordance with at least one embodiment of the invention, there is broadly contemplated herein the automation of the building of one or more configurations of a weather model for a target area, by taking as input target area location information (which can be defined spatially, e.g., based purely on linear coordinates of a map, and/or topographically, e.g., based on topographical features such as a mountainous region of the target area as opposed to a river valley or flood plain region in the same target area), area coverage (e.g., physical extent and/or dimensions of the defined target area), and presently available computing resources, and thereupon determining and proposing a set of weather model configurations most suitable for the target area. To that end, existing model configurations for other geographies having similar characteristics are also included as initial input, and then winnowed down to determine a single target model configuration, or set thereof, as output. The process of configuring the weather model can be exclusively or primarily automated, to reduce manual intervention in connection with using the existing available configurations and to assist in speeding up the model configuration process for a target area. Methods and arrangements broadly contemplated herein may be employed in a very wide variety of contexts and environments, including a HPC (high performance computing) system conducive to the large quantity of data and calculations typically employed in weather modeling. A computer system such as that shown in FIG. 3 may serve as at least a component of such a HPC system, and/or could represent a peripheral system which undertakes one or more processes requiring a smaller scale of computing resources, e.g., to provide a user interface via which user input can be provided.

Figure 1:
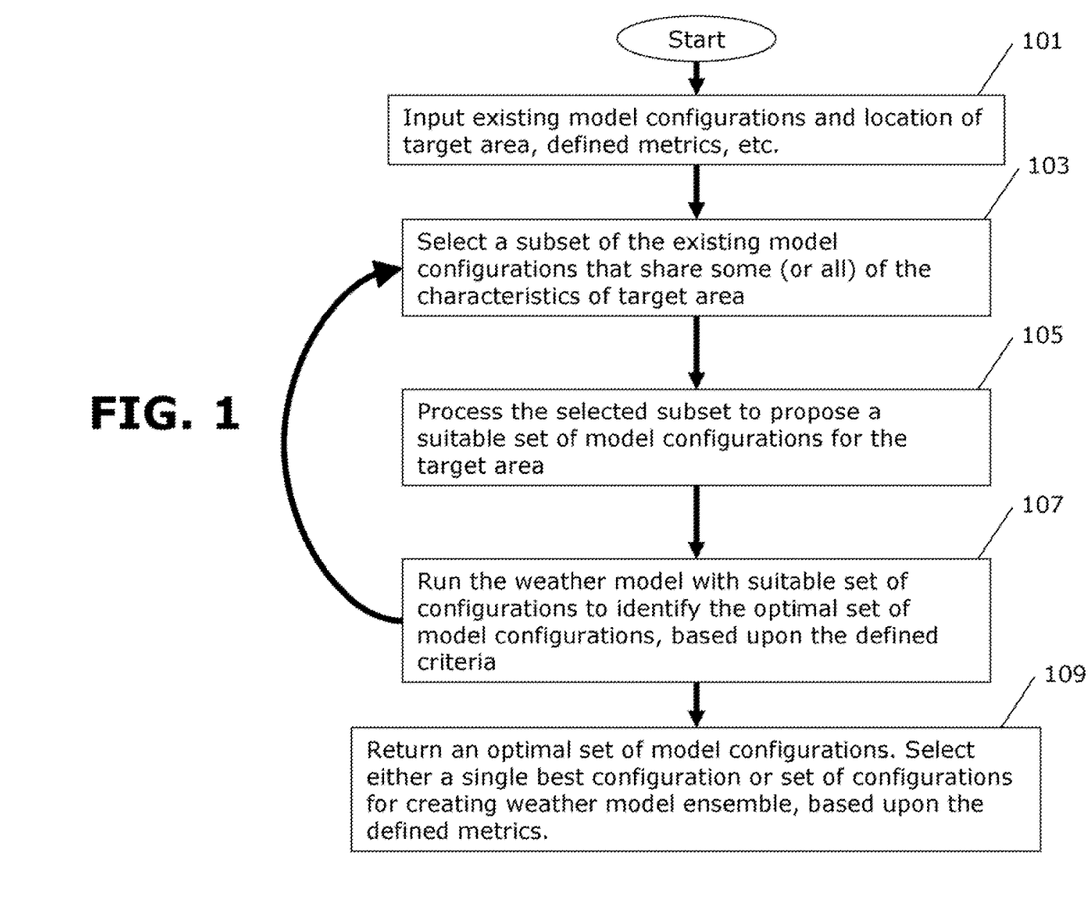
FIG. 1 schematically illustrates a process.

FIG. 1 schematically illustrates a process, in accordance with at least one embodiment of the invention. Steps will first be discussed generally, and then will be expanded upon in more detail further below. First, existing model configurations, relating to a variety of areas other than the target area, and the location of a target area are input along with defined metrics and other inputs (101). By way of illustrative and non-restrictive examples, the defined metrics can include, e.g., a desired precision and/or confidence interval that can be used to evaluate the weather forecasts, while the other inputs can include, e.g., a nesting configuration and number of grid points (while taking into consideration available computing resources). A subset taken from the existing model configurations from step 101 is then selected (automatically, with the possibility of some manual intervention), wherein configurations in the subset correspond to locations that share some or all of the characteristics of the target area (103).

In accordance with at least one embodiment of the invention, the selected subset is then processed to yield, automatically, a suitable set of model configurations for the target area (105); this set will contain at most as many configurations as the aforementioned subset, and may well be winnowed down with respect to the subset. The weather model is run with this "suitable set" of model configurations (107). The process, as determined in accordance with predetermined criteria (which can include one or more thresholding criteria), then may iterate back to the step of selecting a subset of model configurations (103), wherein a new subset for consideration is constituted by those model configurations not yet discarded via the thresholding criteria, and/or by one or more other model configurations that may be newly added at this point. The criteria for returning to step 103 here can include one or more aspects associated with running the model in step 107 and can include, but need not be limited to, a quality of the forecast based upon specific statistical criteria such as accuracy or precision, and/or on the basis of a predetermined confidence interval. Otherwise, if the criteria for returning to step 103 are not met, an optimal set of model configurations is returned, at which point either a single best configuration may be selected, or a set of configurations for creating a weather model ensemble, based upon the aforementioned defined metrics (109). An ensemble model, as such, is a collection of weather models for the same forecast period and area using different input data and/or different model configurations; thus, the subset of model configurations discussed hereabove could be used to construct an ensemble.

In accordance with at least one embodiment of the invention, manual intervention can be employed in any and all of the steps 101-109 in order to verify the suitability of selected (or proposed) configurations, and provide an opportunity to modify the same (e.g., via addition, deletion, editing) if required or desired.

In accordance with at least one embodiment of the invention, input (in step 101) can include, but need not be limited to: location (latitude, longitude) of the centroid of the target area; area coverage; desired precision, confidence interval and other metrics that can evaluate the weather forecast; set of existing model configurations for various locations; and, optionally, number of domains (nested or single domain) and number of grid points taking available computing resources in the consideration. Output (in step 109) can include an optimal set of model configurations, which can be used for selecting the most appropriate configuration for a deterministic model or selecting the ensemble members in ensemble forecasting. This selection can be either performed automatically or manually by the user. Output configuration parameters can include grid resolution, nesting configuration, and various physics-related choices relating to microphysics, dynamics, cumulus parameters, land surface, radiation, etc.

By way of additional details associated with a method in accordance with at least one embodiment of the invention, a process starts (101) with a set of available past model configurations for different locations/geographies which are already shown to work well for their respective locations. These configurations can cover different categories of climatological regions (tropical, subtropical etc.), topography, soil types, vegetation, etc. This model set can be considered as a feature space covering different features of geographical regions and their characteristics.

In accordance with at least one embodiment of the invention, based on the target area and desired accuracy, the feature space is scanned through to select a subset of existing configurations that share some (or all) of the characteristics of the target area (step 103). One way of selecting the matching configurations is to choose those configurations which are in the same geographical regions as the target area. Then, static surface data such as terrain are analyzed to determine constraints on resolution, nest boundaries, vertical resolution, etc. Then, the selected subset of existing configuration parameters are processed (105) to propose a suitable set of model configurations for the target area.

In accordance with at least one embodiment of the invention, the weather models are then run (107) with selected configurations to determine the actual computational requirement and achieved accuracy. The configurations which fall below the criteria defined by the aforementioned metrics, and/or which exceed the desired/available computational requirements, are discarded, e.g., in iterating back from step 107 to step 103. (If required or deemed desirable, a few more potential configurations may be added by performing additional model runs by varying some of the configuration parameters.) Finally, an optimal set of model configurations is returned (109) along with achieved quality, area coverage, domain resolution and computational requirements. The user can either choose a single best model configuration, or multiple model configurations for ensemble based modeling. Manual intervention can be used for some of these steps to verify the suitability of the selected configurations.

Figure 2:
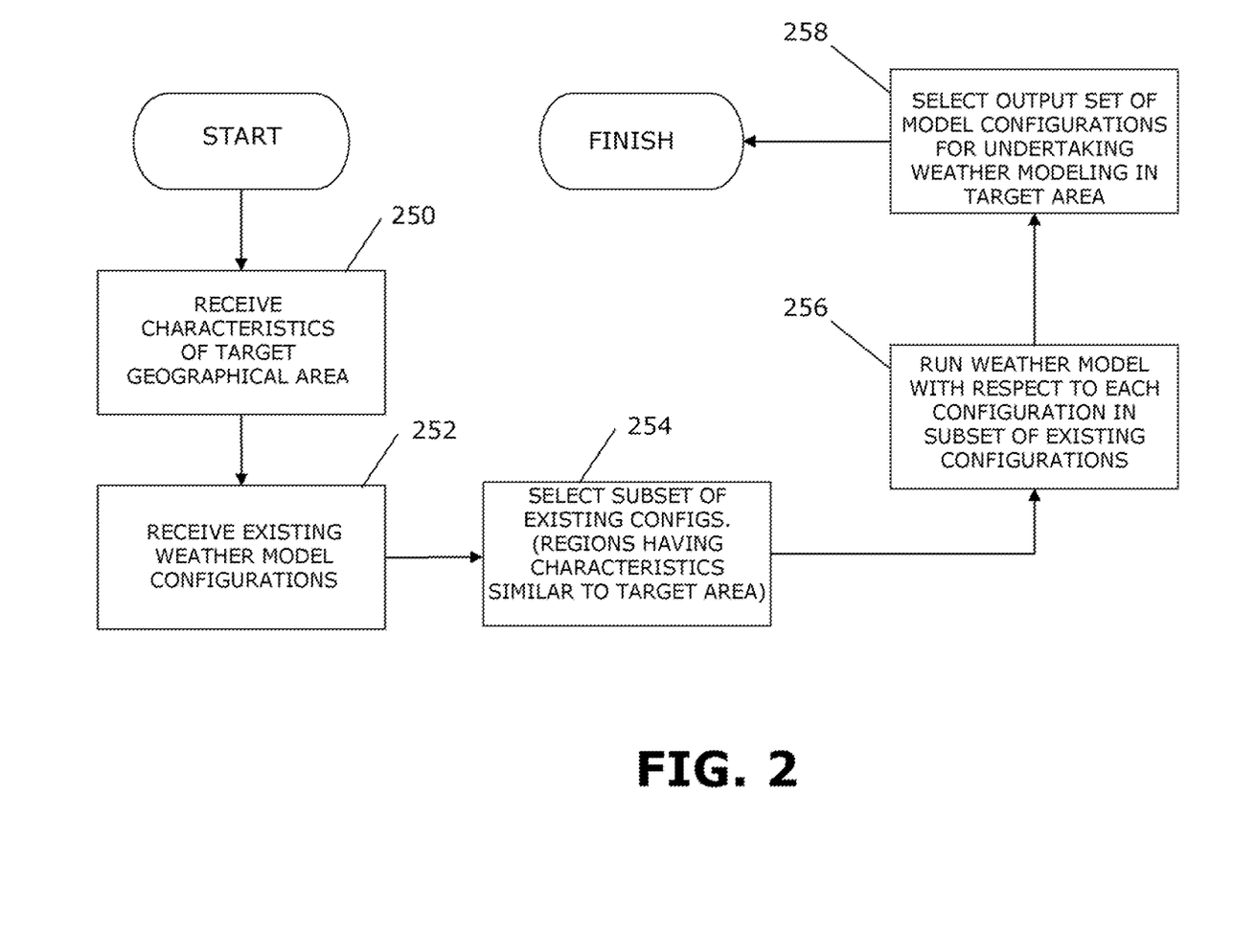
FIG. 2 sets forth a process more generally for automating weather model configurations.

FIG. 2 sets forth a process more generally for automating weather model configurations, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, characteristics of a target geographical area are received (250), as are a plurality of existing weather model configurations which are implemented for undertaking weather modeling in other geographical areas (252). A subset of the existing weather model configurations is selected, the subset comprising configurations corresponding to geographical areas having characteristics similar to the characteristics of the target area (254). A weather model is run with respect to each configuration in the subset of existing weather model configurations (256). Based on the running of a weather model with respect to each configuration, an output set of weather model configurations is selected for undertaking weather modeling in the target area (258).

Figure 3:
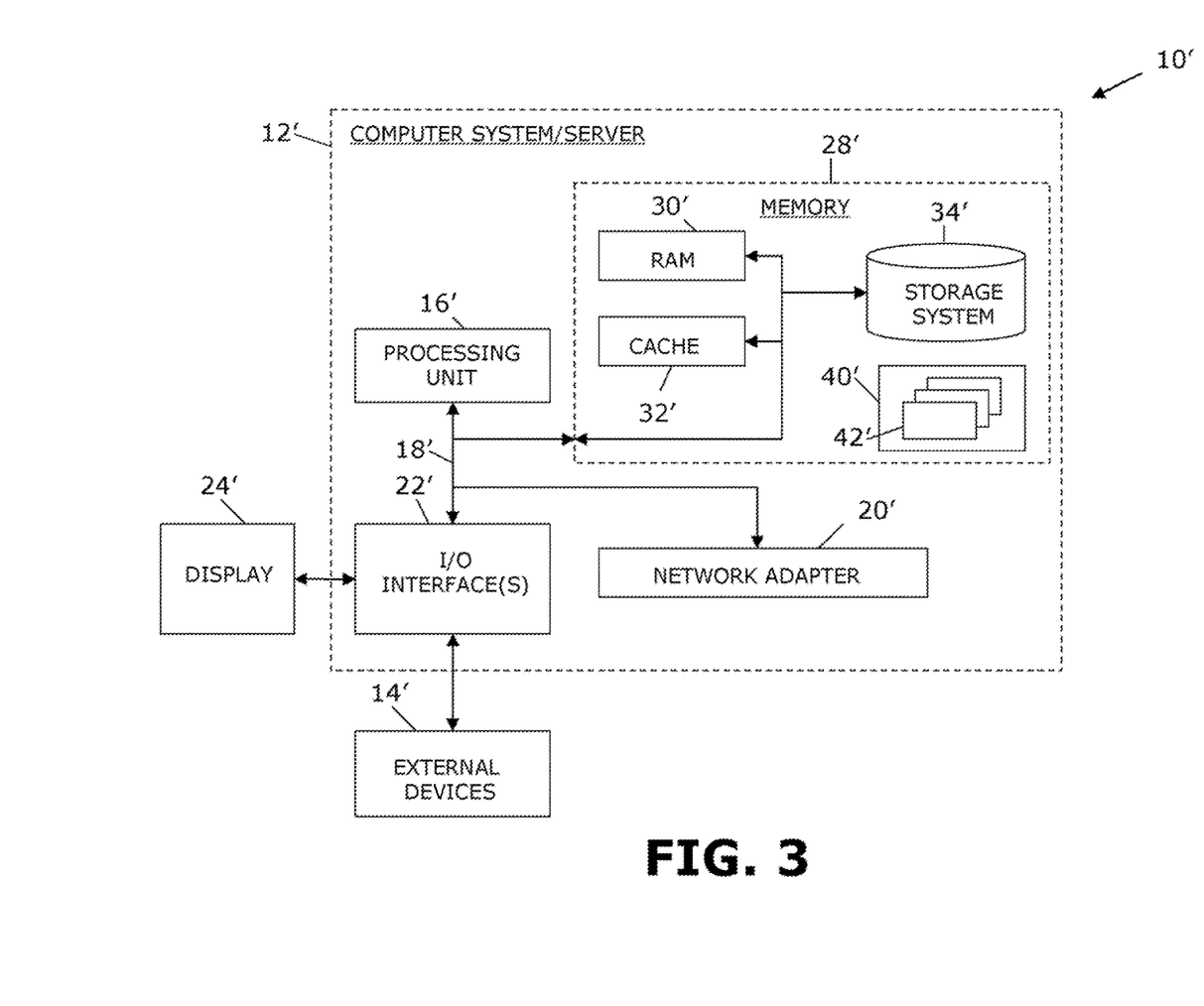
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of automating weather model configurations, said method comprising:
    utilizing a processor to execute computer code configured to perform the steps of:
    receiving characteristics of a target geographical area;
    receiving a feature space comprising a plurality of existing weather model configurations which are implemented for undertaking weather modeling in other geographical areas, wherein a weather model configuration comprises features and characteristics of a geographical area used as input to a weather model;
    analyzing the characteristics of the target geographical area and determining, based on the analysis, constraints on resolution, nest boundaries, and vertical resolution;
    selecting a subset of the existing weather model configurations meeting the determined constraints, the subset comprising configurations corresponding to geographical areas having characteristics similar to the characteristics of the target geographical area, wherein the selecting comprises scanning the feature space and selecting the subset based on the characteristics of the target geographical area and a desired accuracy;
    running a weather model with respect to each of the weather model configurations in the selected subset of existing weather model configurations and determining an achieved accuracy for each of the weather model configurations, wherein said running a weather model comprises running a same weather model on each configuration in the subset independent from the other configurations included in the subset;
    based on said running a weather model, selecting an output set of weather model configurations for use in performing weather modeling in the target geographical area, via iteratively running a weather model with respect to each configuration in the subset of existing weather model configurations and discarding at least one existing weather model configuration based upon at least one predetermined metric and the achieved accuracy of the weather model configuration failing to meet the desired accuracy and wherein selecting an output set of weather model configurations comprises selecting at least one optimal weather model configuration based upon the at least one optimal weather model configuration fulfilling the at least one predetermined metric and the achieved accuracy of the weather model configuration meeting the desired accuracy;
    the output set of weather model configurations comprising the at least one optimal weather model configuration and at least one metric relating to the at least one optimal weather model configuration selected from the group consisting of: achieved quality, area coverage, domain resolution, and computational requirements; and
    implementing the output set of weather model configurations in ensemble weather forecasting for the target geographical area.

2. The method according to claim 1, wherein said selecting of an output set comprises removing at least one model configuration to reduce the revised set of model configurations to a smaller subset of configurations, processing the smaller subset, running a weather model on the smaller subset, and thereafter selecting a revised output set.

3. The method according to claim 1, wherein the characteristics of the target geographical area include at least one member selected from the group consisting of: spatial location information; topographical information; and climatological information.

4. The method according to claim 1, comprising receiving information relating to available computer resources for accommodating the weather model configurations.

5. The method according to claim 4, wherein said selecting of the output set comprises selecting at least one of the model configurations based on available computer resources.

6. The method according to claim 1, wherein the output set includes an ensemble weather model configuration.

7. The method according to claim 1, wherein the characteristics of the target area comprise at least one member selected from the group consisting of: a defining climatological characteristic; topography; soil categories; vegetation categories; and land use.

8. The method according to claim 1, comprising adding at least one additional model configuration to the selected subset.

9. The method according to claim 8, wherein the at least one additional model configuration is derived via a change in at least one criterion for selecting a subset of model configurations from the plurality of the existing model configurations.

10. The method according to claim 8, wherein the at least one additional model configuration is provided via manual input.

11. An apparatus for automating weather model configurations, said apparatus comprising:
at least one processor; and
a non-transitory computer readable storage medium having computer readable program code embodied therewith and executable by the at least one processor, the computer readable program code comprising:
computer readable program code configured to receive characteristics of a target geographical area;
computer readable program code configured to receive a feature space comprising a plurality of existing weather model configurations which are implemented for undertaking weather modeling in other geographical areas, wherein a weather model configuration comprises features and characteristics of a geographical area used as input to a weather model;
computer readable program code configured to analyze the characteristics of the target geographical area and determine, based on the analysis, constraints on resolution, nest boundaries, and vertical resolution;
computer readable program code configured to select a subset of the existing weather model configurations meeting the determined constraints, the subset comprising configurations corresponding to geographical areas having characteristics similar to the characteristics of the target geographical area, wherein to select comprises scanning the feature space and selecting the subset based on the characteristics of the target geographical area and a desired accuracy;
computer readable program code configured to with respect to each of the weather model configurations in the selected subset of existing weather model configurations and determining an achieved accuracy for each of the weather model configurations, wherein said running a weather model comprises running a same weather model on each configuration in the subset independent from the other configurations included in the subset;
computer readable program code configured, based on the running a weather model, to select an output set of weather model configurations for use in performing weather modeling in the target geographical area, via iteratively running a weather model with respect to each configuration in the subset of existing weather model configurations and discarding at least one existing weather model configuration based upon at least one predetermined metric and the achieved accuracy of the weather model configuration failing to meet the desired accuracy and wherein to select an output set of weather model configurations comprises selecting at least one optimal weather model configuration based upon the at least one optimal weather model configuration fulfilling the at least one predetermined metric and the achieved accuracy of the weather model configuration meeting the desired accuracy;
the output set of weather model configurations comprising the at least one optimal weather model configuration and at least one metric relating to the at least one optimal weather model configuration selected from the group consisting of: achieved quality, area coverage, domain resolution, and computational requirements; and
computer readable program code configured to implement the output set of weather model configurations in ensemble weather forecasting for the target geographical area.

12. A computer program product for automating weather model configurations, said computer program product comprising:
a non-transitory computer readable storage medium having computer readable program code embodied therewith, the computer readable program code comprising:
computer readable program code configured to receive characteristics of a target geographical area;
computer readable program code configured to receive a feature space comprising a plurality of existing weather model configurations which are implemented for undertaking weather modeling in other geographical areas, wherein a weather model configuration comprises features and characteristics of a geographical area used as input to a weather model;
computer readable program code configured to analyze the characteristics of the target geographical area and determine, based on the analysis, constraints on resolution, nest boundaries, and vertical resolution;
computer readable program code configured to select a subset of the existing weather model configurations meeting the determined constraints, the subset comprising configurations corresponding to geographical areas having characteristics similar to the characteristics of the target geographical area, wherein to select comprises scanning the feature space and selecting the subset based on the characteristics of the target geographical area and a desired accuracy;
computer readable program code configured to run a weather model with respect to each of the weather model configurations in the selected subset of existing weather model configurations and determining an achieved accuracy for each of the weather model configurations, wherein said running a weather model comprises running a same weather model on each configuration in the subset independent from the other configurations included in the subset;

computer readable program code configured, based on the running a weather model, to select an output set of weather model configurations for use in performing weather modeling in the target geographical area, via iteratively running a weather model with respect to each configuration in the subset of existing weather model configurations and discarding at least one existing weather model configuration based upon at least one predetermined metric and the achieved accuracy of the weather model configuration failing to meet the desired accuracy and wherein to select an output set of weather model configurations comprises selecting at least one optimal weather model configuration based upon the at least one optimal weather model configuration fulfilling the at least one predetermined metric and the achieved accuracy of the weather model configuration meeting the desired accuracy;

the output set of weather model configurations comprising the at least one optimal weather model configuration and at least one metric relating to the at least one optimal weather model configuration selected from the group consisting of: achieved quality, area coverage, domain resolution, and computational requirements; and computer readable program code configured to implement the output set of weather model configurations in ensemble weather forecasting for the target geographical area.

13. The computer program product according to claim 12, wherein said computer readable program code is configured to remove at least one model configuration to reduce the subset of existing weather model configurations to a smaller subset of configurations, process the smaller subset, run a weather model on the smaller subset, and thereafter select a revised output set.

14. The computer program product according to claim 12, wherein the characteristics of the target geographical area include at least one member selected from the group consisting of: spatial location information; and topographical information.

15. The computer program product according to claim 12, comprising receiving information relating to available computer resources for accommodating the weather model configurations.

16. The computer program product according to claim 12, wherein the output set includes an ensemble weather model configuration.

17. The computer program product according to claim 12, wherein the characteristics of the target area comprise at least one member selected from the group consisting of: a defining climatological characteristic; topography; soil categories; vegetation categories; and land use.

18. A method comprising:
receiving spatial, topographical and climatological characteristics of a target geographical area;
determining available computer resources;
receiving a feature space comprising a plurality of existing weather model configurations which are implemented for undertaking weather modeling in other geographical areas, wherein a weather model configuration comprises features and characteristics of a geographical area used as input to a weather model;
analyzing the characteristics of the target geographical area and determining, based on the analysis, constraints on resolution, nest boundaries, and vertical resolution;
selecting a subset of the weather model configurations meeting the determined constraints, based on at least one similarity characteristic with respect to the target geographical area, the at least one similarity characteristic comprising at least one member selected from the group consisting of: a spatial characteristic; a topographical characteristic; and a climatological characteristic, wherein to select comprises scanning the feature space and selecting the subset based on the at least one similarity characteristic and a desired accuracy;
revising the subset based on the at least one similarity characteristic;
running a weather model with respect to each of the weather model configurations in the revised subset of model configurations and determining an achieved accuracy for each of the weather model configurations, wherein said running a weather model comprises running a same weather model on each configuration in the revised subset independent from the other configurations included in the revised subset;
based on said running a weather model, and based on available computer resources, selecting an output set of model configurations for use in performing weather modeling in the target geographical area, via iteratively running a weather model with respect to each configuration in the subset of existing weather model configurations and discarding at least one existing weather model configuration based upon at least one predetermined metric and the achieved accuracy of the weather model configuration failing to meet the desired accuracy and wherein to select an output set of weather model configurations comprises selecting at least one optimal weather model configuration based upon the at least one optimal weather model configuration fulfilling predetermined metric and the achieved accuracy of the weather model configuration meeting the desired accuracy;

the output set of weather model configurations comprising the at least one optimal weather model configuration and at least one metric relating to the at least one optimal weather model configuration selected from the group consisting of: achieved quality, area coverage, and domain resolution; and computer readable program code configured to implement the output set of weather model configurations in ensemble weather forecasting for the target geographical area.

* * * * *